C. G. SMITH.
SPRING WHEEL FOR VEHICLES.
APPLICATION FILED FEB. 28, 1912. RENEWED JULY 31, 1916.
1,218,585.  Patented Mar. 6, 1917.
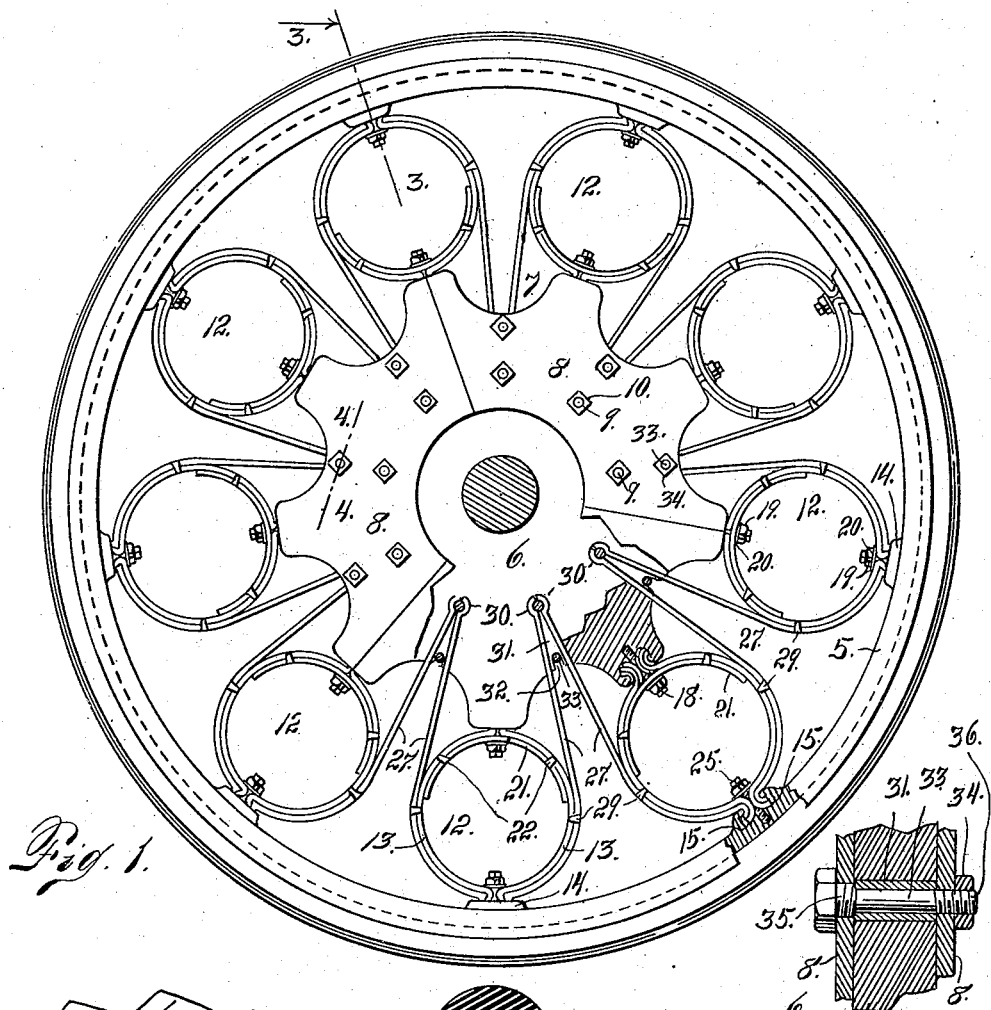
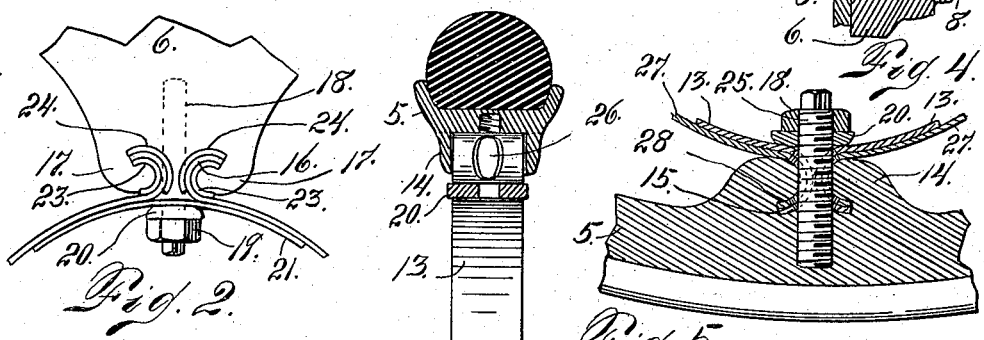
Witnesses
Otto E. Hoddick.
C. H. Rossner.
Inventor
C. G. Smith
By ................
Attorney

UNITED STATES PATENT OFFICE.

CICERO G. SMITH, OF PALISADE, COLORADO, ASSIGNOR TO SMITH SPRING WHEEL COMPANY, A CORPORATION OF ARIZONA.

SPRING-WHEEL FOR VEHICLES.

1,218,585.	Specification of Letters Patent.	Patented Mar. 6, 1917.

Application filed February 28, 1912, Serial No. 680,480. Renewed July 31, 1916. Serial No. 112,460.

*To all whom it may concern:*

Be it known that I, CICERO G. SMITH, a citizen of the United States, residing at Palisade, county of Mesa, and State of Colorado, have invented certain new and useful Improvements in Spring-Wheels for Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring wheels for vehicles, and may be considered an improvement over the construction set forth in my previous application bearing a similar title, filed September 27, 1911, Serial No. 651,662.

My present invention covers a number of novel features all of which will be fully described in detail as this specification proceeds.

Among the novel features not disclosed in my previous application are the following:

The circle springs interposed between the felly of the wheel and the hub are composed of two distinct members, their extremities engaging the hub and felly of the wheel respectively, thus giving additional resilience and better results in a wheel of this character, than where the circle spring is integral.

Again, the circle spring is reinforced on the hub side by a spring member engaging the inner surface of the circle spring and normally conforming to the curvature of the latter.

Furthermore, the plates applied to the opposite sides of the hub for securing the spoke springs in place, are each formed of a number of members, whereby any member may be removed and a new member substituted without discarding the entire plate.

The general construction of the wheel consists of a hub and felly with circle springs interposed therebetween, and spoke springs, whose extremities respectively engage the hub and felly members and embrace the circle springs on opposite sides, the curvature of the spoke springs conforming to that of the exterior curvature of the circle springs for somewhat more than one-half the circumference of the latter.

Having briefly outlined my improved construction, I will proceed to describe the same in detail, reference being made to the accompanying drawing in which is illustrated an embodiment thereof.

In this drawing:

Figure 1 is a side elevation of my improved spring wheel for vehicles.

Fig. 2 is a fragmentary view of the construction illustrating one of the circle springs, and the hub member to which it is secured, the parts being shown on a larger scale than in Fig. 1.

Fig. 3 is a section taken on the line 3—3, Fig. 1, the parts being shown on a larger scale.

Fig. 4 is a section taken on the line 4—4, Fig. 1, on a larger scale.

Fig. 5, is a fragmentary sectional view illustrating the manner of connecting the outer extremities of the circle and spoke springs with the felly of the wheel.

The same reference characters indicate the same parts in all the views.

Let the numeral 5 designate the felly, and 6 the hub of my improved wheel; the hub being star-shaped and reinforced on opposite sides by plates 7 of corresponding shape, each plate being composed of a number of members 8, the plates being connected with the hub by means of bolts 9, 33 fastened by nuts 10 and 34 respectively.

Interposed between the hub and the felly of the wheel is a number of circle springs 12, each composed of two members 13. The outer extremities of these spring members are anchored in interiorly projecting bosses 14 formed on the felly 5. These spring extremities are hook-shaped, as shown at 15, and are adapted to enter recesses formed in a boss 14, clearly illustrated in Figs. 1 and 5. The inner extremities of the spring members 13 are hook-shaped, as shown at 16 to enter curved slots formed in projections 17 of the hub. These curved extremities 16 are inserted laterally into the hub and are secured against lateral movement, by means of bolts 18, which are fastened by interiorly located nuts 19, screwed against washers 20. These washers bear against the central part of an auxiliary or reinforcing spring member 21, which engages the inner surface of the two spring members 13 adjacent the hub, the said auxiliarly spring member bridging the space between, or joint formed by, the inner extremities of the two spring members, where they are connected with the hub, as heretofore explained.

In order to prevent lateral displacement of the reinforcing spring member 21, the latter is provided with lips 22 which extend outwardly and embrace the circle spring members 13 on opposite sides.

In order to make provision for regulating the tension of the circle springs, auxiliary members 23 and 24 are employed. These members engage the curved extremities 16 on opposite sides. If it is desired to increase the tension of the circle springs, the member 24 may be removed and placed on the outside, or farther from the securing bolt, thus bringing the inner extremities of the spring members 13 nearer together. On the other hand, if it is desired to diminish the tension of the circle springs, the member 23 may be removed and placed on the opposite side of the curved extremity 16 of each spring member. The hub projections 17 are recessed to make room for the auxiliary devices 23 and 24.

The outer extremities 15 of the circle spring members are secured in their anchored position on the felly of the wheel by means of bolts 25, which are threaded into the felly and engage recesses 26 formed in the curved extremities 15 of each spring member 13. These openings 26 are formed midway between the opposite edges of the curved extremities of the spring members, and by virtue of the entrance of the bolts thereinto, give additional security in anchoring the circle springs to the felly of the wheel.

The circle springs are embraced on opposite sides by spoke springs 27 whose curvature conforms to the curvature of the circle springs for somewhat more than one-half of the circumference of the latter, in the direction of the felly of the wheel. The outer extremities of the spoke springs are also anchored in the bosses 14 of the felly, their extremities being curved, as shown at 28, and engaging the curved ends 15 of the circle spring members on the outside. These spoke springs are provided with inwardly bent lips 29 which engage the opposite edges of the circle spring members and maintain the proper relation between the two sets of springs, whereby lateral displacement is obviated.

The inner extremities of the spoke springs are inserted in slots formed transversely through the hub member 6. As illustrated in the drawing, the inner ends 30 of the spoke springs are curved to embrace the bolts 9, which are passed through the hub 6, and serve to secure the reinforcing members 8 of the plate 7 to the hub member 6. These plates, by embracing the hub member 6 on opposite sides maintain the inner portions of the spoke springs securely in place within the hub against lateral displacement.

Interposed between the inner hub portions of each pair of spoke springs, is a wedge 31 which separates the two spoke spring members and maintains their bolt-engaging extremities in proper relation with the adjacent parts to prevent displacement or withdrawal from the hub. The wedges are bifurcated at their outer extremities, as shown at 32, to form seats which are engaged by bolts 33, the said bolts passing through the connected parts and being secured in place by nuts 34.

From the foregoing the use and operation of my improved construction will be readily understood, and need not be explained further in detail.

Attention is called to the fact that in fastening the spoke and circle springs to the parts with which they are connected, a special construction and arrangement are employed. For instance, the screws 18 and 25 are threaded into the hub and felly respectively, being inserted by the use of a wrench or other tool, their outer extremities being polygonal in cross-section to receive a wrench if desired. After threading these bolts into the hub and felly respectively, the washers and nuts are applied. It will, however, be understood, that in case these nuts should become loose, the bolts will still maintain their position, since they are threaded into the hub and felly as aforesaid.

Attention is also called to the fact that the bolts 9 and 33 are of special construction, having threaded opposite extremities of different diameters and oppositely threaded. For instance, the shank of a bolt 33 adjacent the hub, is somewhat enlarged and has a left-hand screw thread, as shown at 35, and when applied for the purpose intended, is threaded into the adjacent plate member 8. Beyond the part 35 the shank of the bolt is of uniform diameter, and its extremity 36 is provided with a right-hand thread to which the nut is applied.

By virtue of this construction, if there should be a tendency to loosen the nut, the loosening force would be in a direction to tighten the threaded part 35 in its plate member 8.

Attention is called to the fact that the plate member 8 through which the screw threaded part 36 of the bolt passes, has a plain or unthreaded opening, while the plate member through which the screw threaded part 35 passes, is threaded to receive the bolt.

Having thus described my invention, what I claim is:

1. A spring wheel for vehicles comprising a rim, a hub, circle springs interposed between the rim and hub, each of said springs being composed of two semi-circular members connected in operative relation, the extremities of the circle spring members being respectively anchored in the hub and rim, a reinforcing spring member of concentric curvature embracing the inner portions of each pair of circle spring members and bridging the joint between them, suitable means for connecting the reinforcing spring member of the circle spring members and the hub of the vehicle, and spoke springs embracing the circle spring members on opposite sides and having their extremities anchored in the hub and the rim respectively, substantially as described.

2. A spring wheel for vehicles, comprising a rim, a hub, circle springs interposed between the rim and the hub, each of said springs being composed of two semi-circular members connected in operative relation, the extremities of the circle spring members being respectively anchored in the rim and hub, and a reinforcing spring member of concentric curvature embracing the inner portions of each pair of circle spring members and bridging the joint between them, substantially as described.

3. In a spring wheel comprising a hub and rim, curved springs interposed between the hub and rim, the extremities of said springs being anchored in the hub and rim, respectively, and a reinforcing spring member of concentric curvature embracing adjacent extremities of each pair of spring members bridging the joints between them.

In testimony whereof I affix my signature in presence of two witnesses.

CICERO G. SMITH.

Witnesses:
 FRED W. HOLT,
 HANLOCK J. NORTHMORE.

Copies of this patent may be obtained for five cents each, by addressing the "Commissioner of Patents, Washington, D. C."